Figure 1:
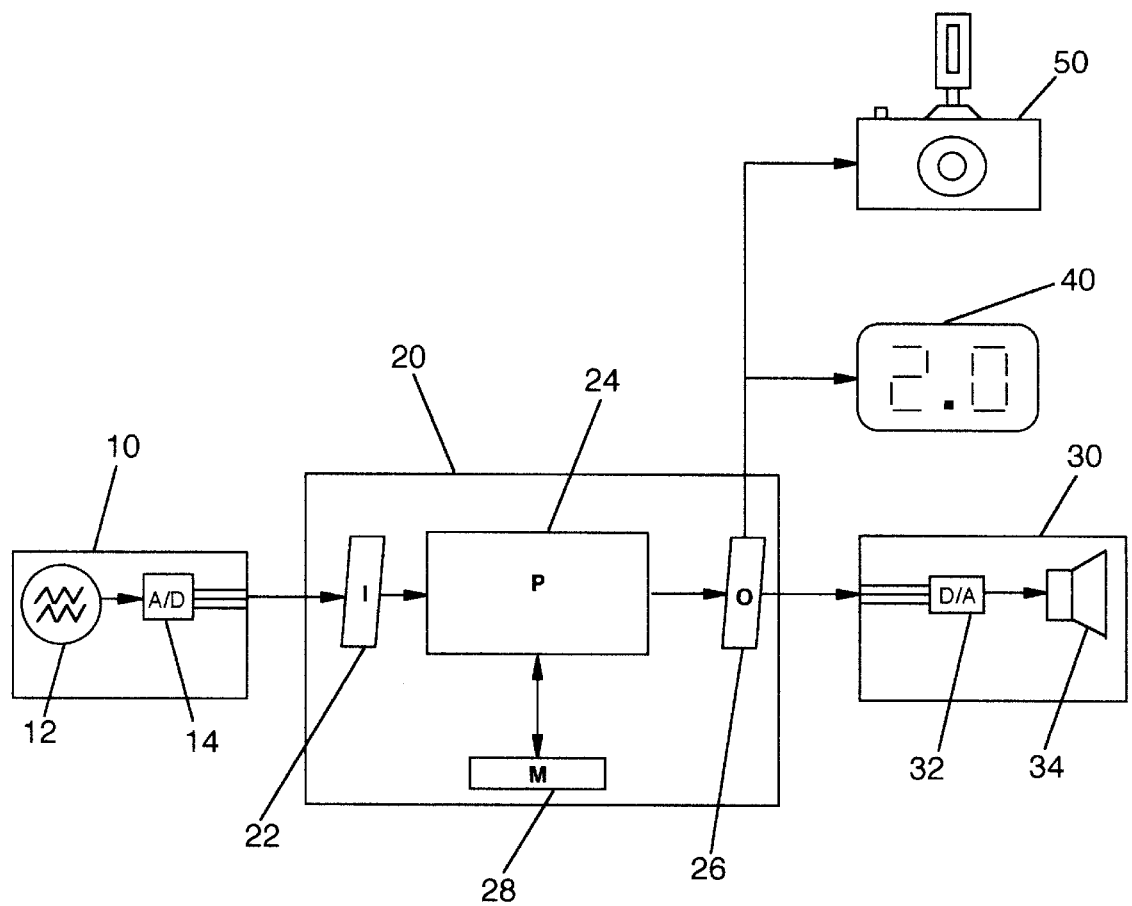

United States Patent
Bhukhanwala

[11] Patent Number: 5,835,801
[45] Date of Patent: Nov. 10, 1998

[54] SIMULTANEOUS METERING MODES IN CAMERAS USING AUDIO OUTPUT

[76] Inventor: Saumil A. Bhukhanwala, c/o Julie Harders, 3113 NE. Briarwood Dr., Ankey, Iowa 50021

[21] Appl. No.: 682,286

[22] Filed: Jul. 17, 1996

Related U.S. Application Data

[60] Provisional application No. 60/001,401 Jul. 24, 1995.

[51] Int. Cl.$^6$ .............................. G03B 9/00; G03B 3/00
[52] U.S. Cl. ........................................... 396/283; 396/125
[58] Field of Search ..................... 396/283, 119, 396/120, 121, 122, 123, 124, 125

[56] References Cited

U.S. PATENT DOCUMENTS

| | | | |
|---|---|---|---|
| 4,238,146 | 12/1980 | Kimamura | 354/53 |
| 4,270,852 | 6/1981 | Suzuki | 354/23 D |
| 4,286,849 | 9/1981 | Uchidoi et al. | 396/283 |
| 4,367,933 | 1/1983 | Sahara | 396/283 |
| 4,459,008 | 7/1984 | Shimizu | 354/467 |
| 4,734,777 | 3/1988 | Okino et al. | 396/283 |

*Primary Examiner*—Safet Metjahic
*Assistant Examiner*—Nicholas J. Tuccillo

[57] ABSTRACT

A camera equipped with a data processing device with memory to execute stored data and program instructions for a plurality of metering modes, which analyze light data input from a light metering device. The output of the data processing device is connected to a viewfinder, to an audio output device and to relevant camera settings. The processor executes instructions based on a main metering mode, such as matrix metering, to determine exposure settings of camera, and to display results in the viewfinder. The processor then executes instructions based a second auxiliary—metering mode—which is set to an available mode, such as spot metering, and associates a sequence of sound types to the resulting exposure information. The sequence is then output to the audio output device, thereby enabling a photographer to meter a scene by "listening". Visual feedback from the main mode and audio feedback from the auxiliary mode, enables a quick "feel" of light from more than one mode in a visually non-distractive manner for a given shot, without switching among modes. The invention discloses suitable sound types to present abstract exposure effects such as detail, segment exposures, etc., which are difficult to quantify numerically, without visual clutter.

10 Claims, 1 Drawing Sheet

SIMULTANEOUS METERING MODES IN CAMERAS USING AUDIO OUTPUT

This application is based on the Provisional Patent Application 60/001,401 filed Jul. 24, 1995.

BACKGROUND—FIELD OF INVENTION

This invention relates to the field of photography—specifically to light metering, where the amount of light in a scene is measured to determine correct exposure.

BACKGROUND—DESCRIPTION OF PRIOR ART

In photography, light metering is an important operation. A photographer needs to know the quantity of light available and reflected from different regions of a scene or a subject being shot. Accordingly, camera adjustments are made for the correct exposure. Cameras today have sophisticated meters built in, or photographers use external hand-held meters to determine light levels. Also, modern cameras offer different metering modes based on the degree of control desired such as:

a) Spot or Manual: When a photographer needs full control of exposure, spot metering is used. In this mode, the camera measures only a "spot" or small area within the frame. This mode is useful in finding exact brightness levels of selected areas of the scene, such as white snow, green grass, skin tones, clothes, etc. The output is indicated using LED (light emitting diode) or LCD (liquid crystal display) readout or an electromagnetic needle deflection.

b) Average or Automatic: Modern cameras are equipped with automatic exposure schemes. Cameras take an average reading over the entire frame (or center region) to determine exposure. The problem is that an average reading may not be good enough because the subject may occupy a small region of the frame, and the background, if too light or dark, will introduce errors. As a result, the camera may try to darken a well-balanced subject, because the background is too light.

c) Matrix or Intelligent: This mode is similar to average or automatic, except that the metering method is more intelligent than simply averaging the frame. In this mode the camera breaks up the frame into regions or segments. The camera then tries to guess where the subject or the point of interest is based on light analysis of each segment. Proper exposure is determined based on segments containing the subject.

Each mode has its advantages and drawbacks. Spot metering, if not interpreted carefully, can lead to huge errors. This mode is best used manually and when setup time is available. Matrix metering is useful when the camera is given full control and the photographer wants consistent exposures within fair limits. However, in this mode the photographer is not guaranteed successful results—he is at the mercy of the camera intelligence. If photographers intentionally need to render certain objects lighter or darker than neutral gray, they must rely on spot or center weighted metering to obtain the tonal values in specific regions. Even in Matrix mode, a photographer must switch temporarily to other modes so that she can override the camera and take manual control of exposure, if needed.

There are two basic issues concerning metering modes:

a) Which mode or modes should one switch between for a given short; and b) After finalizing a mode, and in a given amount of time, how quickly call information (even if it is approximate) from all other modes be obtained for that shot.

Based on the problem of switching back and forth modes, and the fact that certain approximate indicators from all modes are also extremely meaningful, I have come up with the following invention:

SUMMARY OF INVENTION

In my invention metering information is conveyed by sound. This can be done in various ways—such as changing the pitch of a given sound to indicate variations in light intensity. Along with pitch, amplitude and quality can be varied to convey exposure latitude (the range of exposure levels between which detail will be captured on film, or in digital cameras). Thus, for certain dark or light shades where detail may not be captured, the amplitude of sound can be radically increased or decreased. (Films and electronic imaging devices are known to produce maximum detail at neutral gray exposure, and detail diminishes as tones become lighter and darker, until certain shades of black/white have no detail. Also, different films have different latitudes).

My invention enables the camera to operate in a given mode with visual feedback appearing in a viewfinder and simultaneous audio feedback to indicate approximately the "feel" of any of the other modes.

U.S. Pat. No. 4,238,146 to Nikon Corporation (1980) and U.S. Pat. No. 4,270,852 to Canon Kabushiki Kaisha (1981) describe how sound has been used in cameras to indicate battery conditions, slow shutter speeds, flash conditions, or minimum brightness level.

There has not yet been a comprehensive method to convey metering information, such as f-stops & zones (where zone V is neutral gray), quality of detail at different zones, or general highlight and shadow contrast. The main reason is because this is too much information to present to a photographer in the viewfinder, or on the camera body, without causing visual distraction. However, if sound (preferably non verbal) conveyed this information, photographers could choose to follow it or not, because their attention on the photographic composition is not diverted. Prior inventions, relate exposure data to sound as a warning indication only, not as a metering method. In the present invention sound is consciously followed to make sense of metering—enabling a photographer a feel of more than one mode at a time without being burdened by numeric, visual information. The sound-producing cameras today do not allow photographers to work in two or more modes at the same time.

The problems with current metering modes are:

a) None of the modes are completely reliable. The modes are designed to serve different functions. A photographer may prefer to be in matrix mode but may want to shift to spot metering, for a quick survey of light distribution. Unfortunately the photographer may forget to revert to the previous mode.

b) All meters provide information visually. Camera information usually appears in the viewfinder through LED or LCD readouts. This may force a photographer to take her eyes off the subject. At times, the camera is mounted on a tripod and the photographer is not even looking into the viewfinder because she may not wish to touch it or is using a remote shutter release.

Some cameras use a sound alarm to warn when lighting is below or above a particular level. Sound is known to be an effective way to alert the photographer rather than using distractive viewfinder data as disclosed in U.S. Pat. No. 4,459,008 to Canon (1984). However, such cameras are simply providing a warning using a fixed sound—not communicating continuous metering information.

c) Today's metering gives exposure data only.—Limitations on the amount of information that may appear in the viewfinder means cameras can present limited exposure information. Even though accurate exposure data is displayed in the viewfinder, sometimes a photographer needs to know the effect of exposure, rather than the exposure itself. The effect may be in terms of film detail, overall contrast, mood, (low key or high key), or expected saturation. This exposure effect information needs to be approximate, not accurate, because it is subjective anyway. Sometimes a photographer needs to know is whether highlights or shadows are within a given range to produce detail (so as to fit film latitude). She may not really be interested in the fact that the shadows were 1.66 stops underexposed.

Thus using sound with variations in timbre, pitch, amplitude, and duration/intermittence is a very efficient and effective way to communicate exposure effect data which is also multi-featured and subjective.

OBJECTS AND ADVANTAGES

I will refer to such metering where sound is used to indicate light information as audio metering or auxiliary metering. Conventional metering using visual output will be termed main metering. At any given moment the auxiliary or the main metering is directly set to or based upon the specific metering technologies available in that camera, such as matrix, spot, or average.

a) Audio metering provides an auxiliary metering method in conjunction with LCD or LED displays of main metering. Thus, while shooting in matrix (intelligent) modes, spot metering information can simultaneously be indicated as sound variations. This gives a rough "feel" for the tonal distribution without using numbers or readouts. Even though the average photographer may not be a musician, the sound variations sufficiently indicate the zones or the exposure effects in a rough manner. Shifting back and forth among modes is avoided.

Even if main and audio modes were operating in the same metering mode, there could be a considerable improvement in interaction. Audio metering will help reconfirm main metering.

b) Audio metering is non-visual output. A photographer using audio metering is not distracted while composing images or when shooting with the camera on a tripod and using a remote shutter release. A photographer is able to pull out the camera and point it approximately toward the subject, foreground or background and just "hear" the tonal range. Current methods utilize only visual output which is much more involved than sound.

c) The effects of exposure rather than exposure alone can be conveyed through sound:

i) Audio metering is non numeric and approximate—which is needed when a photographer wants to know general information, such as shadow detail. The sound could be a beep with a lower than normal pitch, if slightly underexposed, or the amplitude and quality of sound can be radically different (with intermittence) if significantly underexposed and no detail.

ii) Sound can convey sequential information, rapidly. A list of related parameters or a sequence of light values can be conveyed through audio metering. If such a sequence were animated in the viewfinder, that would divert attention from the composition and would require concentration to monitor numeric or ionic data.

iii) Overall relations of tones (or color) may be required. The effects of exposure can be conveyed using sudden or smooth changes in types of sound, pitch, amplitude, or a plurality of sounds. This means that detail, latitude or spatial distributions of tones can be conveyed together with the actual metered information.

Reference Numerals In FIG. 1
10 Light meter
12 Light sensing elements
14 Analog to digital convertor
20 Data processing device
22 Input interface
24 Processor
26 Output interface
28 Memory
30 Audio output device
32 Digital to analog convertor
34 Speaker
40 Viewfinder
50 Camera settings

DESCRIPTION—FIG. 1

Light intensity is measured by a light meter 10, which contains a plurality of light sensitive elements 12, and an analog to digital converter 14. The output of the light meter 10, is connected to a data processing device 20, through a suitable input interface 22. Light data from light meter 10 is available at processor 24 for analysis. The processor 24 is a general purpose data processor which has sufficient registers and cache memory to hold temporary data. The programs and data for metering, sound generation, etc., are stored in memory 28. The processor 24 outputs data using an output interface 26, which drives an audio output device 30, visual data of a viewfinder 40, and relevant camera settings 50.

OPERATION—FIG. 1

The essence of the operation is a program stored in memory 28, which associates a set of metering—related parameters to a set of suitable sound types. This association can be preprogramnmed in the form of tables, computations which map metering—related parameters to sound types, or it can be user defined and downloaded from an external data processing device. The program which achieves audio metering can be described as follows:

Repeat: Steps 1 through 7

Step 1: Prepare the camera to operate according to user selections of a main metering mode, camera settings, and an auxiliary metering mode. The main metering mode and the auxiliary metering mode are typically set by the photographer to one of the available modes built in the camera, such as spot, average, matrix, etc.

Step 2: Obtain a predetermined number of one or more light related samples from light meter 10 by reading digital data from analog to digital converter 14, for analysis by data processing device 20. Interpret these samples by executing programmed procedures for the mode selected as the main metering mode, residing in memory 28.

Step 3: Display resulting exposure-data derived from the main metering mode, such as shutter speed, aperture, etc. in the viewfinder 40. The exposure-data is used to appropriately adjust the camera settings 50 to achieve a proper exposure as computed by the main metering mode.

Step 4: Obtain a predetermined number of one or more light related samples from light meter 10 by reading digital data from analog to digital converter 14, for analysis by data processing device 20. Interpret these samples by executing procedures for the mode selected as the auxiliary metering mode. The result of processing is stored as an input set of auxiliary metered parameters. (the results of auxiliary metering mode do not change the camera exposure related settings 50, such as shutter speed and aperture, which were set by the main metering mode).

Step 5: Based on a predetermined lookup table in memory 28 and the exposure data resulting from the main metering mode, associate a set of predetermined sound types stored in memory 28 to the stored input set of auxiliary metered parameters.

Step 6: Output the set of sound types to the speaker 30, using processor 24 and digital to analog converter 32 to generate the sound signals.

Step 7: Check if any camera settings have been changed by the user (upon hearing the auxiliary metering) and make suitable adjustments.

Until (user turns off audio metering).

The steps 1 through 7 enable a photographer to obtain metering information from two modes for a given shot. The main metering mode presents results visually, and the auxiliary mode uses audio feedback. If however metering information from more than two modes is required, the same steps 1 through 7, can be repeated by changing the auxiliary mode either by the photographer's choice or automatically at predetermined intervals, or upon certain conditions firing a shot. Thus, the steps 1 through 7 must not be accepted as limiting the camera to two modes.

Step 2 through Step 6 is implemented with sufficient speed so that the photographer obtains the viewfinder output of the main metering mode and audio output from auxiliary metering mode within a typical time interval between composition and the shot. If processing power does not permit such a speed, then two programs and two processors and also possibly two light metering circuits could easily be used to multi-task both metering modes. Because this is expensive, it is not preferred.

A preferred embodiment for associating sound variations with metered parameters is as follows: The metering mode for main metering is set to matrix or the best automated metering available in that camera. The exposure settings of aperture, shutter speed etc., will therefore be set based on matrix metering. The preferred mode set for audio metering, is spot metering. The input set of auxiliary metered parameters has one value—the spot metered value. If the spot metered value is equivalent in exposure to the current combination of aperture, shutter speed etc., then that value would be Zone V or neutral gray. Each zone is separated by 1 f-stop. For every spot metered value the output sound type is described as follows:

a) Neutral regions:

For Zone V (18% gray): A pleasing sound (referred to as neutral sound) of a predetermined pitch and amplitude.

F or Zone IV (1 stop underexposed): The same sound quality and amplitude as in Zone V but with a lower pitch.

For Zone VI (1 stop overexposed): The same sound quality and amplitude as in Zone V but with a higher pitch.

b) Highlight/Shadow regions with detail:

Zone III (2 stops underexposed): The same sound as in Zone IV but with intermittence (or breaking, pulsating, sound) to indicate break in detail.

Zone VII (2 stops overexposed): The same sound as in Zone VI but with intermittence (or breaking, pulsating, sound) to indicate break in detail.

c) Extremes with little or no detail:

Zone 0, Zone I and Zone II: A sound distinctly different from the Zone V sound and with much lower amplitude than the Zone V sound. The sound is preferably dull and non-energetic. The amplitude of sound diminishes from Zone II until almost silence in Zone 0. The pitch should remain almost constant in these zones.

Zones VIII, Zone IX, and Zone X: A sound distinctly different from the Zone V sound and with much higher amplitude than the Zone V sound. This sound also must be different from the sound in Zones 0, I, II. The sound is preferably of tense nature. Amplitude must increase from Zone VIII to Zone X. The pitch should remain almost constant.

In short, fine but noticeable tonal changes must be rendered with pitch variations, as in neutral zones (IV to VI). Distinctly different regions such as extreme shadows or extreme highlights or neutrals must have distinct sounds and amplitudes. Regions where transition of detail takes place (Zone II—Zone III, and Zone VII—Zone VIII) must have break up in sounds to indicate fall of detail.

Also, sound associations with zones need not be on an accurate basis. In other words, the sound for Zone III can be associated +½ stop from Zone III or −½ stop from Zone III. depending on latitude of film, and processing variations, user specifications, etc.

The pitch of sound is controlled by the rate at which sound data is output by processor 24, to digital to analog converter 32. The amplitude of sound is controlled when processor 24 multiplessound samples by a suitable scaling factor prior to output to converter 32. Intermittence is achieved when processor 24, alternately reduces and increases the amplitude of sound at desired intervals during output to 32.

This preferred embodiment is one of the many ways of implementing audio metering, and is not a limitation on the invention. Sound associations also can be implemented as follows, as an alternative to the preferred embodiment.

i) In the simplest of forms, there can be one sound type which varies in pitch along with input variations in metering. The pitch associated with mid-tones can be referred to as normal pitch. Preferably, higher than a normal pitch is used for light metering of a predetermined stops (such as +1, +1.5, etc.) above neutral gray. Likewise, lower than normal pitch sounds could indicate metering of a predetermined stops (such as −1 or −1.5, etc.) below neutral gray.

ii) In Matrix metering mode the camera measures different regions or segments of a frame. It then decides how to weigh each segment to compute the exposure rather than a simple average. A sequence of sound types is used to quickly give a feel for the light balance—to the photographer. Three sounds are used to indicate the metering for the subject segment, the segment to its left, and to its right. This is a case wherein the auxiliary metering mode is equivalent to the main metering mode. Because the parameters for each segment would clutter a viewfinder, they are expressed as a sound sequence.

iii) A quick sequence of notes can be easily understood to indicate how the shadows relate to highlights (without getting into numeric data). Two sound types are used, one to indicate average of shadow-related metering and a second sound for average of highlight-related metering.

SUMMARY, RAMIFICATION, AND SCOPE

The main idea behind this invention is to use audio output in cameras either with films or digital cameras for simultaneously working in two or more modes, such as spot, average, matrix. Sounds should be preferably non-verbal, abstract notes or beeps varying in pitch, amplitude, nature, and duration, which indicate the mood of tones, detail, etc. Because sound output has the ability to convey just the feel of the situation quickly and without visual distraction, it is an important adjunct to main metering using LED, or LCD displays, which display visual information.

The new effects of this invention are:
a) Efficient way of simultaneously working in different metering modes, wherein only one of the modes determines camera exposure settings.
b) Conveying abstract exposure effects (such as detail, overall contrast, spatial tonal relations) rather than mere exposure data in terms of f-stop alone.
c) Using intermittence of sound to conveying expected detail for a given exposure and camera settings.
d) Conveying approximately the "feel" for light using one or more sound types, rather than burdening the photographer with numeric visual data.

The invention described in FIG. 1., can be implemented without using a digital processor if a simpler, completely analog approach is required. It would then be necessary to simply use the electrical output of the light sensitive means to control the pitch, amplitude or nature of sound generating circuit that drives a speaker or audio output device.

The same principle can be extended in other electronic imaging related instruments, such as digital cameras, densitometers, calibration tools, or even while sampling digital image data displayed on monitors or oscilloscopes.

A graphics program can present similar audio output when the user scrolls image data using a pointing device such as a mouse or pen, for multi-mode operations involving different color spaces (CNIYK, RGB, etc.). What applies to modes of metering can be extended to color spaces in imaging programs. Just as too much cannot be displayed in the viewfinder of the camera, so is the case with the monitor. In fact, programs such as Adobe Photoshop™, display pixel information of modes such as RGB, HSL, or CMYK at the same time in an "info window". The principles of audio metering could well be applied here and simultaneous color space information could be presented as sound. Histogram effects (similar to exposure effects) could be audio-based as accuracy is not always necessary. Often monitor calibration conditions cannot be relied on visually, Audio metering can be used effectively to indicate color information (hue or saturation) not just luminosity. Color shifts or casts due to light temperature or filters, reciprocity information can be built in or programmed.

I envision that matrix metering (where cameras work their best) with audio spot metering (for human feel) would offer the best of both worlds, with neither the camera nor the human being constantly jumping modes.

EXPLANATION OF TERMS IN PRIOR ART a) Metering: a procedure used in photography to measure the light reflected of a subject or the light incident on the scene. This is done using a light sensitive meter in the camera or off the camera and the reading is displayed in the viewfinder using LED or LCD.
b) Pitch: the frequency of the sound.
c) Amplitude: the volume of sound.
d) Soundtype: the timbre or the kind of sound it is, ie. whether a beep or a chirping sound or a bell or any other.
e) Zone: the range of tones from black to white has been divided into 11 zones. Zone 0 being black, Zone X being white, Zone V being neutral gray. Each zone is one f-stop apart. Detail is best rendered when an object is exposed at Zone V. Detail begins to diminish for darker and lighter exposures from Zone V. For practical purposes, Zone III to Zone VII, record fair detail. The extreme black or extreme white have no detail.

EXPLANATION OF TERMS IN PRESENT INVENTION a) Audio metering: A method of metering developed in this invention, in which sound or audio output is used to indicate the feel of metered light values by varying one or more features such as timbre, pitch, amplitude, duration, or intermittence or a plurality of sounds.

Such metering would not burden photographers with numbers but would approximately convey the feel for light while shooting blindly in automatic modes.

b) Multi mode metering: most cameras work in any one metering mode such as spot, average, center-weighted or matrix at a given time. In this invention, at a given time the camera can work in at least two modes—the main mode with viewfinder data (or on camera display) and another auxiliary mode with audio feedback. However, only the main mode determines exposure settings, but the audio feedback provides adequate information to a photographer to override camera automation, when necessary.

In this way the photographer need not switch between modes as frequently and confusion in viewfinder is avoided as well (if such a dual scheme were to be implemented without sound). More than two modes are possible when sound data is produced using different auxiliary modes at different times such as while setup of shot, just before exposure, or just after exposure.

c) Exposure effect data: typically meters provide only exposure data in terms of f-stops. The effect or the implications of this exposure on the final rendering of the image is left to the photographer. In this invention, the effect of exposure such as film detail. Overall contrast, mood or spatial relations of tone can be conveyed through variations in sound or with a sequence of sounds.

I claim:

1. In a camera equipped with a data processing device which accepts input light data from a light metering device, and outputs predetermined sound types to an audio output device, and has a storage means for information about detail captured by camera medium for different operating conditions, a method comprising the steps of
   a. computing amount of loss in detail using said light data, current camera settings, and the stored camera medium information
   b. output to said audio output device, a suitable sound type characterized by an intermittence rate which is computed using said amount of loss in detail whereby a photographer can expect loss in detail for a given exposure, film or medium, and other camera settings upon "hearing" sound types with different intermittence.

2. The method of claim 1, wherein the intermittent sound type is output only for certain predetermined conditions of light data and camera settings.

3. In a camera equipped with a data processing device capable of executing a plurality of programmed metering modes, wherein said data processing device can accept input from a light metering device, provide feedback to a visual output device, and output predetermined sound types to an audio output device, a method comprising the steps of a. obtaining a set of light parameters by operating said light metering device based on one of the metering modes which has been set as a main metering mode, to determine exposure settings of said camera and provide suitable feedback using the visual output means, b. obtaining an auxiliary set of light parameters by operating said light metering device based on a metering mode set as an auxiliary metering mode, which provides additional feedback without having an impact on exposure settings of the camera, c. executing a programmed means to associate said auxiliary set of light parameters to a sequence of one or more predetermined sound types, d. output the sequence of sound types to an audio output device, whereby a photographer gets feedback, for a given shot, from more than one metering mode in a visually non-distractive manner and without switching among metering modes.

4. The method of claim 3, wherein the auxiliary metering mode is set a mode which is equivalent to the mode to which the main metering mode is set to.

5. The method of claim 3, wherein the auxiliary metering mode is set to spot metering and the main metering mode is set to matrix metering.

6. The method of claim 3, wherein the data processing device accesses program information from a non-volatile memory.

7. The method of claim 3, wherein the data processing device accesses program information from a volatile memory and said program information is downloaded in the memory from an external data processing device using a communication link.

8. The method of claim 3, wherein said audio output device is connected by a remote communication means to said camera.

9. The method of claim 3, wherein said camera is a digital camera wherein information is directly captured to a digital storage device.

10. The method of claim 3, wherein said visual output device is a screen of a computing device which is connected by a communication means to said camera.

* * * * *